3,466,309
PRODUCTION OF NEO-ACIDS
Herbert L. Wehrmeister, Terre Haute, Ind., assignor to Commercial Solvents Corporation, New York, N.Y., a corporation of Maryland
No Drawing. Filed Feb. 6, 1967, Ser. No. 614,012
Int. Cl. C11c 1/00; C07d 85/44
U.S. Cl. 260—413                2 Claims

ABSTRACT OF THE DISCLOSURE

A process for the production of neo-acids, i.e. organic acids having a completely substituted α-carbon atom, by the hydrolysis of 2 - substituted - 2 - oxazolines in the presence of an acid.

BRIEF SUMMARY OF THE INVENTION

This invention relates to a process for the production of neo-acids. In a particular aspect, it relates to a process for the production of neo-acids by the hydrolysis of 2-substituted - 2 - oxazolines having a completely substituted α-carbon atom, i.e. the carbon atom linking the side chain to the ring.

Neo-acids are compounds having a completely substituted α-carbon atom (i.e. the carbon atom adjacent to the carboxyl radical), and are so named because of their structural resemblance to neopentane (2,2 - dimethyl propane). Several neo-acids, e.g. neopentanoic, neoheptanoic, neodecanoic, an neotridecanoic are commercially available. They are produced from carbon monoxide and branched-chain olefins.

Neo-acids are characterized by their chemical stability resulting from steric hindrance at the α-carbon. However, they can be reduced to the corresponding aldehydes and alcohols, and they form salts with alkaline materials. Neo-acids have a variety of uses. They react with acetylene to form vinyl derivatives which can be polymerized to form plastics. The cadmium and barium salts are stabilizers for vinyl resins, and the peroxyesters are catalysts for polymerization reactions. These acids and their derivatives also find utility in the preparation of cosmetics, perfumes, insect repellents, as well as a number of other products.

It is an object of this invention to provide a process for the production of neo-acids.

It is another object of this invention to provide a process for the production of neo-acids by the hydrolysis of 2 - substituted - 2 - oxazolines having a completely substituted α-carbon atom.

The discovery of this invention is a process for the production of neo-acids corresponding to the following general formula:

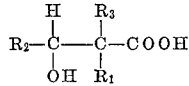

wherein $R_1$ can be alkyl of from 1 to about 16 carbon atoms, alkenyl of from 2 to about 16 carbon atoms, hydroxymethyl or aryl; $R_2$ can be hydrogen, alkyl of from 1 to about 15 carbon atoms, or phenyl; $R_3$ can be alkyl of from 1 to about 15 carbon atoms, or hydroxyalkyl of from 1 to 15 carbon atoms, or phenyl.

These neo-acids are produced by the hydrolysis of a group of 2 - oxazolines (the Group I oxazolines) corresponding to the formula

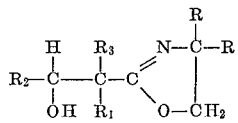

wherein R can be hydrogen, alkyl of from 1 to 3 carbon atoms, or hydroxymethyl, and $R_1$, $R_2$ and $R_3$ are defined above.

DETAILED DESCRIPTION

The hydrolysis reaction is conducted under hydrolysis conditions in the presence of water and a mineral acid catalyst. Hydrolysis conditions include a reaction temperature of from about 20° C. to reflux conditions, i.e. at about 100° C. or somewhat above. The reaction is conducted for a period of time sufficient to effect the hydrolysis, for instance for a time of 1 to 15 hours. After the heating period, the reaction, if incomplete, can be advantageously allowed to continue at room temperature for a period of 24 to 36 hours, preferably with agitation. The mineral acids are preferably diluted to from about 10% to about 50% by weight, and when desired, additional water is added to provide fluidity to the reaction mixture. The reaction can also be conveniently conducted in the presence of a suitable solvent, for the oxazoline. Suitable solvents include the lower alkanols, e.g. methanol, ethanol, isopropyl alcohol, and butanol.

The neo-acid produced can be conveniently separated from the reaction mixture, if desired, by cooling the mixture and allowing the neo-acid to crystallize. In some cases it is advantageous to reduce the volume of the reaction mixture to approximately one-half or less by evaporation of some of the water and solvent, if any, in order to obtain better recovery of the neo-acid. After separation the neo-acid can be recrystallized from water or other suitable solvent, if desired. An alternate procedure for separating the neo-acid from the reaction mixture is by solvent extraction with a suitable solvent, such as ethyl ether.

The amount of acid catalyst employed will depend upon the particular catalyst; however, these amounts will generally range from about 10% to about 200% by weight of the catalyst, preferably from about 50 to 100 percent, based on the weight of the oxazoline. Suitable acid catalysts include organic and inorganic catalysts and include inorganic mineral acids such as sulfuric and hydrochloric acids, preferably hydrochloric acid.

The Group I oxazolines from which the neo-acids are derived can be prepared by any suitable method, several of which are known. Commercial grade materials are satisfactory when available. One method of preparation is to condense 1 to 2 moles of an organic carbonyl compound with a Group II oxazoline corresponding to the formula

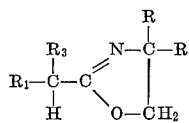

wherein R, $R_1$ and $R_3$ have the same meaning set forth above. In the reaction the carbonyl compound is condensed with the α-carbon atom attached to the 2-position of the oxazoline replacing the hydrogen atom attached thereto. $R_3$ can also be provided by employing an oxazoline having a hydrogen atom in place of $R_3$ and reacting it with a second mole of the carbonyl compound, thereby replacing the hydrogen atom with $R_3$.

Among the Group II oxazoline compounds useable in the preparation of the Group I oxazolines are 2 - ethyl-4,4 - dimethyl - 2 - oxazoline; 2 - propyl-4,4-dimethyl-2-oxazoline; 2 - benzyl - 4 - methyl-4-hydroxymethyl-2-oxazoline; 2 - methyl - 4,4 - bis(hydroxymethyl)-2-oxazoline; 2,4,4 - trimethyl - 2 - oxazoline; 2-ethyl-2-oxazoline; 2-(1-methylethyl) - 4,4 - dimethyl - 2 - oxazoline; 2-ethyl-4-methyl - 4 - hydroxymethyl-2-oxazoline; 2-heptadecenyl-4-methyl-4-hydroxymethyl-2-oxazoline.

Organic carbonyl compounds suitable for the preparation of the Group I oxazolines include aromatic aldehydes and aliphatic aldehydes, e.g. usually those containing from 1 to about 15 carbon atoms. Among the suitable carbonyl compounds are formaldehyde, including paraformaldehyde, acetaldehyde, and benzaldehyde, including substituted benzaldehyde, e.g. parachlorobenzaldehyde, ortho - chlorobenzaldehyde, para - hydroxybenzaldehyde, para-dimethylaminobenzaldehyde, and metanitrobenzaldehyde.

The following examples will serve to illustrate the invention but it is not intended that the invention be limited thereby.

Example 1.—Preparation of 2,2-bis(hydroxymethyl)-propionic acid

2 - [1,1 - bis(hydroxymethyl)ethyl] - 4,4-dimethyl-2-oxazoline, 40 g., was charged to an acid resistant reaction vessel equipped with a reflux condenser. Hydrochloric acid, 100 ml. concentrated acid diluted with 100 ml. water was added and the mixture was heated for 3 hours at reflux temperature. Following the heating period the solution was extracted continuously for 37 hours with 500 ml. of ethyl ether. The neo-acid extracted by the ether crystallized and was separated by filtration. It was recrystallized from water and dried under vacuum. The melting point found was 192–193° C., lit. 181–185° C. The neutral equivalent (acid) was 136.1, theoretical 134.1. Equivalent weight by hydroxy determination (acetylation method) was 135.1.

General procedure for hydrolysis of 2 - substituted-2-oxazolines to neo-acids.—The 2 - substituted - 2 - oxazolines of Examples 2–5 are hydrolyzed to the neo-acids by the following general procedure:

The oxazoline (0.1 mole) is dispersed in 200 ml. of dilute hydrochloric acid (1 part conc. HCl to 1 part water) in a reaction vessel equipped with a reflux condenser and heated at reflux for at least three hours. The mixture is allowed to stand at room temperature for about 24–36 hours. It is then cooled and the precipitated solid is collected by filtration, washed with 2× 50 ml. of water and dried. The crude product can be purified, if desired, by any suitable method, e.g. it can be recrystallized from a suitable solvent. If the neo-acid does not precipitate on cooling, it can be recovered by extraction with a suitable solvent, e.g. ethyl ether.

Example 2.—Preparation of 3-phenyl-3-hydroxy-2,2-dimethyl-1-propionic acid

A mixture of 141 g. of 2-(1-methylethyl)-4,4-dimethyl-2-oxazoline and 106 g. of benzaldehyde is heated at 99 to 105° for 8 hours to produce 2 - (1,1 - dimethyl-2-hydroxy - 2 - phenyl - ethyl) - 4,4 - -dimethyl-2-oxazoline, a Group I oxazoline.

This compound is hydrolyzed according to the general procedure. 3 - phenyl -3 - hydroxy-2,2-dimethyl-1-propionic acid is obtained.

Example 3.—Preparation of 2,2-bis(hydroxymethyl)-propionic acid

A mixture of 258.6 g. (about 2 moles) of 2-ethyl-4,4-dimethyl-2-oxazoline and 150 g. (about 4 moles of formaldehyde equivalent) of paraformaldehyde was heated at 95 to 121° for 6.5 hours. The mixture was cooled somewhat and benzene, 400 ml., was added and the mixture was heated to boiling, filtered, and cooled to room temperature. The solid which separated was collected and was identified as 2[1,1-bis(hydroxymethyl)ethyl]-4,4-dimethyl-2-oxazoline. It is hydrolyzed according to the general procedure and 2,2-bis(hydroxymethyl)-1-propionic acid is obtained.

Example 4.—Preparation of Tris(hydroxymethyl) acetic acid

The experiment of Example 2 is repeated except that 2,4,4-trimethyl-2-oxazoline was used as the oxazoline with 100 g. of paraformaldehyde. The mixture was heated at 95–121° C. for 6.5 hours, then cooled somewhat, and benzene, 400 ml., was added. The mixture was then heated to boiling, filtered and cooled to room temperature. The solid which separated was collected and was identified as 2-tris(hydroxymethyl)-2-methyl - 4,4 - dimethyl-2-oxazoline. It is hydrolyzed according to the general procedure and tris(hydroxymethyl)acetic acid is obtained.

Example 5.—Preparation of 2,2-bis(hydroxymethyl) oleic acid

The experiment of Example 2 is repeated except that the oxazoline employed is 2-heptadecenyl-4,4-dimethyl-2-oxazoline and the product obtained by condensation with formaldehyde is 2-[1,1-bis(hydroxymethyl)-2-heptadecenyl]-4,4-dimethyl-2-oxazoline. It is hydrolyzed according to the general procedure and 2,2-bis(hydroxymethyl)oleic acid is obtained.

Example 6.—Preparation of 2,2-bis(hydroxymethyl)-propionic acid

The experiment of Example 1 is repeated except that sulfuric acid is substituted for hydrochloric acid as the catalyst. The product obtained is 2,2-bis(hydroxymethyl)-propionic acid.

I claim:
1. A process for the production of neo-acids corresponding to the general formula

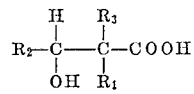

comprising the hydrolysis of an oxazoline corresponding to the formula

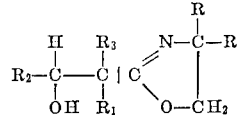

wherein R is hydrogen, alkyl of from 1 to 3 carbon atoms, or hydroxymethyl; $R_1$ is alkyl of from 1 to about 16 carbon atoms, alkenyl of from 2 to about 16 carbon atoms, hydroxymethyl, or phenyl; $R_2$ is hydrogen, alkyl of from 1 to about 15 carbon atoms, or phenyl; and $R_3$ is alkyl of from 1 to about 15 carbon atoms, hydroxyalkyl of from 1 to about 15 carbon atoms, or phenyl under hydrolysis conditions to produce the neo-acid, said hydrolysis conditions comprising heating said oxazoline in the presence of 10–200% by weight based on the weight of said oxazoline of an acid catalyst selected from the group consisting of sulfuric acid and hydrochloric acid and diluted to 10–50% by weight with water, and continuing said heating for a time sufficient to effect said hydrolysis.

2. The process of claim 1 wherein the hydrolysis is conducted for a period of time of from about 1 to about 15 hours at a temperature of from about 20° C. to reflux temperature.

References Cited

Billman et al.: Jour. Amer. Chem. Soc., vol. 67, pp. 1069–70, 1945.

LEON ZITVER, Primary Examiner

H. T. MARS, Assistant Examiner

U.S. Cl. X.R.

260—307, 520, 521, 535